April 17, 1962     W. L. MORRISON     3,029,967
INSULATED SHIPPER CONTAINER
Filed Jan. 2, 1959     3 Sheets-Sheet 1
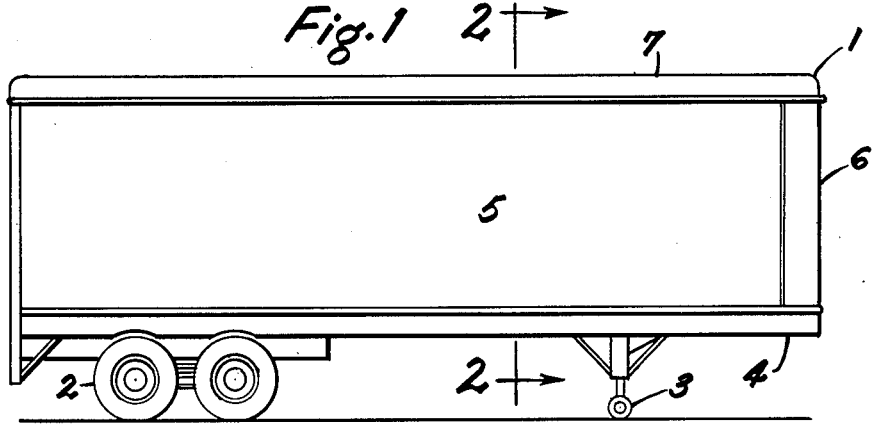
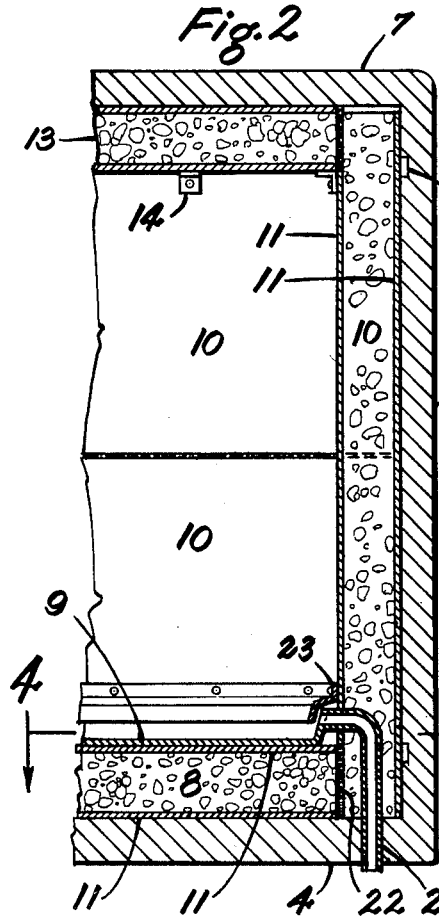
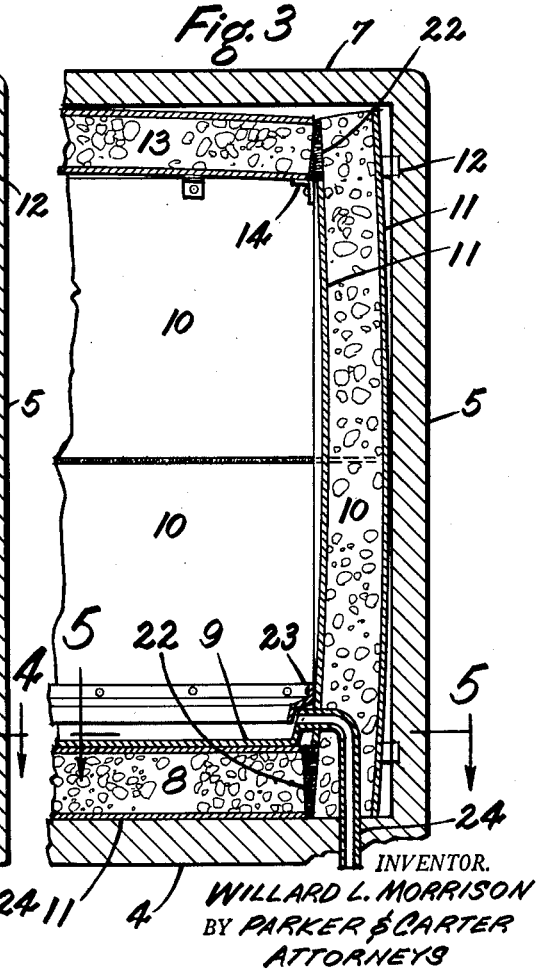
INVENTOR.
WILLARD L. MORRISON
BY PARKER & CARTER
ATTORNEYS

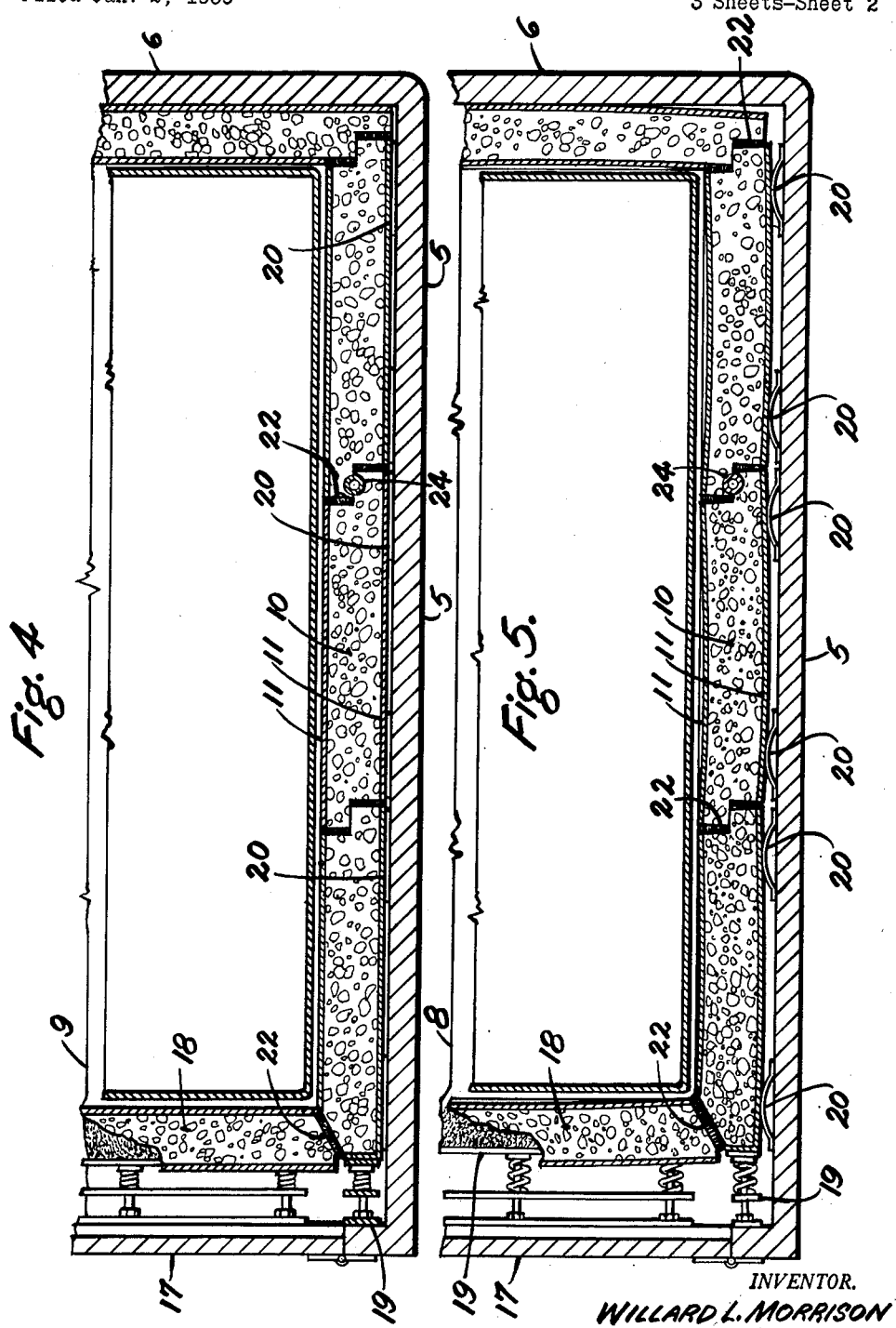

April 17, 1962 W. L. MORRISON 3,029,967
INSULATED SHIPPER CONTAINER
Filed Jan. 2, 1959 3 Sheets-Sheet 3

INVENTOR.
WILLARD L. MORRISON
BY PARKER & CARTER
ATTORNEYS

United States Patent Office 3,029,967
Patented Apr. 17, 1962

3,029,967
INSULATED SHIPPER CONTAINER
Willard L. Morrison, Lake Forest, Ill., assignor to Liquefreeze Company, Inc., New York, N.Y., a corporation of New York
Filed Jan. 2, 1959, Ser. No. 784,662
3 Claims. (Cl. 220—9)

This invention relates to improvements in cold storage vessels and the like and has for one object to provide an easily installable insulation therefor.

Another object is to provide insulation which will remain tight independent of changes in the temperature inside and outside the chamber.

The invention is illustrated as applied to a motor vehicle or truck body but may equally well be applied to railroad cars or other portable or fixed cold storage vessels.

The invention is illustrated more or less diagrammatically in the accompanying drawings, wherein:

FIGURE 1 is a side elevation of a trailer adapted to use my invention;

FIGURE 2 is a section along the line 2—2 of FIGURE 1 showing the insulation at room temperature;

FIG. 3 is a similar section showing the insulation when cold;

FIGURE 4 is a section along the line 4—4 of FIGURE 2;

FIGURE 5 is a section along the line 5—5 of FIGURE 3;

Like parts are indicated by like characters throughout the specification and drawings.

Figure 7:
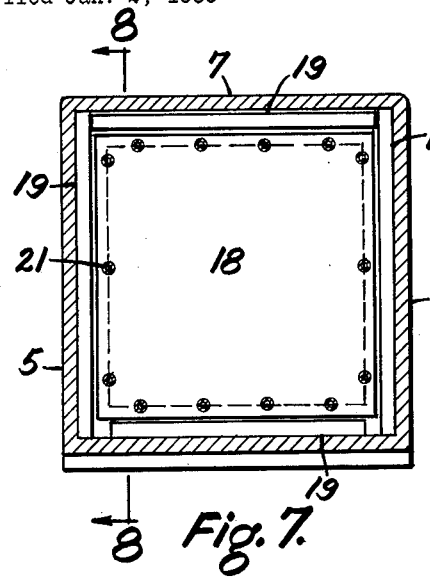
FIGURE 7 is a section along the line 7—7 of FIGURE 6 with the receptacle doors closed.
Figure 8:
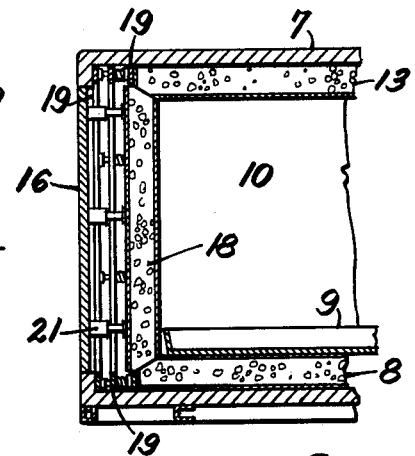
FIGURE 8 is a section along the line 8—8 of FIGURE 7.
Figure 6:
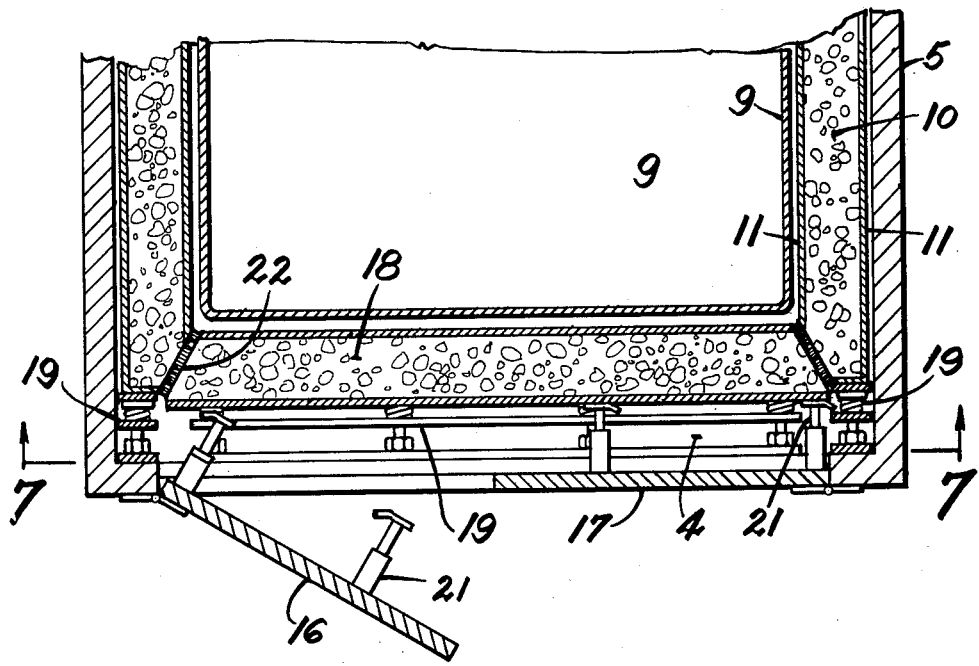
FIGURE 6 is a horizontal section showing the receptacle door partially opened.

The truck body 1 has the usual road wheels 2 and castor wheels 3. The towing hitch forming no part of the present invention is not illustrated. The truck body can be opened at the rear end as is usual with such vehicles. It has bottom, side, front and top walls 4, 5, 6 and 7. The bottom 4 carries horizontally disposed slabs 8 of rigid, self-supporting insulation such as dyalite. Supported on these slabs is a tread plate 9. Adjacent the side walls 5 and end wall 6 are a multiplicity of similar flat, self-supporting insulating dyalite slabs 10, vertically disposed, resting at their lower edges on the floor 4 and extending upwardly to the top of the vehicle. The floor slabs 8 abut at their outer edges on the inner faces of the side slabs 10. The slabs are preferably faced with suitable plywood or other sheathing 11 on their inner and outer faces.

The clearance between the edges of the panels 8 and the side and end walls of the vehicle body is substantially greater than the thickness of the slabs 10 and the slabs 10 are urged inwardly by a multiplicity of flat leaf springs 12 between their outer faces and the inner walls of side and end. Roof slabs 13 are carried by brackets 14 on the slabs 10 and the clearance between the edges of the slabs 13 and the side and end walls is also such that the springs 12 are able to take up the clearance and hold the slabs inwardly against the roof and floor slabs to make tight joints which are further assisted by the fact that the abutting portions of the slabs are provided with a suitable packing, which may be carpet or other pile material, flexible and expandible and which remains soft under cold conditions. All of the panels are so equipped. This packing 22 expands and contracts to close any gaps which may develop between the abutting surfaces as a result of their expansion, contraction or change in shape resulting from thermal changes, vibrations, twisting or aging.

As shown in FIGURES 2 and 4, with the slabs warm, the panels are held together by the springs 12 to maintain tight joints which inhibit air passage between the panels.

As shown in FIGURES 3 and 5, when the slabs are cold, the panels warp as indicated, the inner face being colder than the outer face and so shortening. The cold panels reduce in length somewhat and the springs expand as shown to compensate for this variation so that hot or cold, independent of warping, distortion, change in dimension, the panels are maintained in edge to edge tight abutment.

The doors 16 and 17 close against an end panel 18, and force it against the rearmost edges of the panels 10, when the door is closed to make a tight joint with those edges. Spring pressed stops 19 are recessed inside trailer structural flanges to prevent jack-in-the-box effect when the doors are open. The packing or pile at the inner ends of the panels 10 is sufficient to make a tight joint when the door is closed.

Spring pressed stops 20 between the vehicle body and the floor and roof slabs 8 and 13 urge them yieldingly together. The spring pressed stops or plungers 21 are interposed between the doors 16 and 17 and the end panel 18 when the doors are closed and urge the slab 18 inwardly against the bottom, side and top slabs. The slab 18 is put in place after the cargo is installed while the doors are open, the doors being thereafter closed to hold the slab in place.

If the contents of the trailer is to be cooled after loading by the use of such a coolant as liquid nitrogen at atmospheric pressure poured onto the packaged foodstuffs in the trailer, any excess of the liquid can be caught in the combination shallow pan and tread plate 9 which rests on the floor slab 8. In this case, flanges 23 will be carried by the vertical slabs to interlock with the pan and prevent liquid flowing down outside of it. Such liquid will be drained off through the vent 24.

Since the side, end and door panels are loosely mounted and the floor and roof panels are located between the vertically disposed side, end and door panels and since there is ample clearance provided, the yielding springs take up the clearance and hold the slidably loosely mounted panels in place to define a continuous refrigeration chamber. Since there is ample clearance and since the springs can yield or expand as the case may be, the panels are held in work, substantially air tight relationship with one another at their abutting edges or where the edges abut the sides so as to maintain a tight refrigeration chamber under all conditions of operation.

It is well known that insulation changes in size and shape as conditions change. Thermal variation is one of the factors, vibration, torsion, change in moisture content and perhaps other reasons cause sometimes great and sometimes small changes. The present invention compensates for all these changes no matter how, when or where they occur because as the insulating slabs shrink, the yielding means cause the slabs to follow one another to maintain tight joints. As they expand, the yielding means give to permit the slabs to expand without buckling. The yielding means maintains tight contact even when there is no change in size or shape and compensates for torsional twist of the vehicle body, still maintaining the joints tight enough so that the packing will inhibit air circulation between the insulated objects contained within the container and the outside.

The insulating panel or slab of dyalite or such insulating material is the filling for a sandwich of plywood or other board on opposite faces of the panel. This plywood is stiff and rigid as plywood always is both in warm and cool condition. If desired, the edges of the dyalite between the plywood may project slightly beyond the plywood and under those circumstances the dyalite itself which is flexible even under cold conditions may furnish the packing to seal the abutting edges of the panels. Under these circumstances separate packing means other than panel filling can be dispensed with.

I claim:

1. In an insulating structure, a plurality of separate, vertically disposed, insulating wall panels, brackets on the inner faces of the wall panels, roof panels loosely supported thereby and abutting at their ends on the wall panels, a housing enclosing the structure, spring members interposed between the housing and the wall panels, biasing them inwardly against the roof panels, some of the wall panels defining a vertically disposed end wall, other of the wall panels extending at right angles to the end wall and yielding means biasing said second mentioned panels into edge to edge contact with one another and into contact with the end wall panels.

2. A structural housing open at one end and including top, bottom, side and end walls, vertically disposed insulating wall panels extending upwardly from the bottom and terminating adjacent but below the roof, brackets extending inwardly from the wall panels below the top edge thereof, top insulating panels loosely supported by said brackets, yielding means for biasing adjacent panels into contact with each other, yielding means interposed between the housing walls and the end panels biasing them inwardly against the roof panels.

3. In combination, a generally rigid, self-supporting housing open at one end and having a roof, a floor, side and end walls, vertical insulating panels adjacent the side and end walls, resting on the floor and terminating short of the roof, brackets extending inwardly from the side and end panels below the top edges thereof, insulating roof panels loosely supported on said brackets, yielding means biasing adjacent panels into contact with each other independent of thermal change, yielding means biasing the upper portions of the wall panels into contact with the adjacent roof panels independent of thermal change.

References Cited in the file of this patent

UNITED STATES PATENTS

| | | |
|---|---|---|
| 850,060 | Schulte | Apr. 9, 1907 |
| 1,733,758 | Sealey | Oct. 29, 1929 |
| 1,832,904 | Hull | Nov. 24, 1931 |
| 2,240,916 | Springford | May 6, 1941 |
| 2,523,145 | Robinson | Sept. 9, 1950 |
| 2,591,151 | Hansen | Apr. 1, 1952 |
| 2,803,368 | Koch | Aug. 20, 1957 |